United States Patent
Kracke

(10) Patent No.: US 11,466,788 B2
(45) Date of Patent: Oct. 11, 2022

(54) PRESSURE RELIEF VALVE ASSEMBLY

(71) Applicant: Goodrich Actuation Systems Limited, Solihull (GB)

(72) Inventor: Jeremy Kracke, Staffordshire (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 16/668,081

(22) Filed: Oct. 30, 2019

(65) Prior Publication Data
US 2020/0208749 A1    Jul. 2, 2020

(30) Foreign Application Priority Data

Dec. 31, 2018 (EP) ..................................... 18275271

(51) Int. Cl.
*F16K 15/00* (2006.01)
*F16K 17/04* (2006.01)

(52) U.S. Cl.
CPC ........ *F16K 17/0406* (2013.01); *F16K 17/048* (2013.01); *Y10T 137/7842* (2015.04); *Y10T 137/88054* (2015.04)

(58) Field of Classification Search
CPC ....... Y10T 137/7842; Y10T 137/88054; Y10T 137/7838; F16K 15/026; F16K 15/044; F16K 15/042; F16K 17/048
See application file for complete search history.

(56) References Cited

U.S. PATENT DOCUMENTS

| | | | | |
|---|---|---|---|---|
| 485,740 A | * | 11/1892 | Gallon | F16K 15/063 137/512.3 |
| 1,889,122 A | * | 11/1932 | Hewitt | F16K 15/04 137/512.3 |
| 2,306,012 A | * | 12/1942 | Campbell | F16K 15/042 137/512 |
| 2,500,156 A | * | 3/1950 | Dechant | F16K 15/18 137/512.3 |

(Continued)

FOREIGN PATENT DOCUMENTS

| | | |
|---|---|---|
| CH | 565337 A5 | 8/1975 |
| CN | 204299361 U | 4/2015 |

(Continued)

OTHER PUBLICATIONS

Extended European Search Report for International Application No. 18275271.7 dated Jul. 3, 2019, 8 pages.

*Primary Examiner* — Robert K Arundale
(74) *Attorney, Agent, or Firm* — Cantor Colburn LLP

(57) ABSTRACT

A pressure relief valve assembly comprising a valve housing within which is provided a primary pressure relief valve having a valve ball and a valve spring, the valve spring biasing the valve ball in a first direction into a valve seat to prevent the passage of fluid from a fluid line through the valve, and wherein the spring force is selected such that a fluid force above a predetermined set point acting against the ball in a second direction opposite the first direction causes the ball to move out of the valve seat against the spring force to allow fluid to flow from the fluid line through the valve seat and through the valve, and wherein a secondary valve is positioned relative to the primary valve to retain fluid around the valve spring of the primary valve at a fluid force below the predetermined set point.

5 Claims, 3 Drawing Sheets

(56) References Cited

U.S. PATENT DOCUMENTS

| | | | |
|---|---|---|---|
| 3,426,779 A | 2/1969 | Corbin | |
| 3,542,063 A * | 11/1970 | Etter | F16K 15/063 |
| | | | 137/512.3 |
| 3,589,397 A * | 6/1971 | Wagner | F16K 1/305 |
| | | | 137/614.2 |
| 4,340,084 A * | 7/1982 | Snow | F16K 15/042 |
| | | | 137/512 |
| 4,392,507 A * | 7/1983 | Harris | B60K 15/03519 |
| | | | 137/38 |
| 4,852,605 A | 8/1989 | Gouhier | |
| 4,953,588 A * | 9/1990 | Sands | F16K 15/063 |
| | | | 137/512.3 |
| 5,141,025 A * | 8/1992 | Eichhorn | F16K 15/044 |
| | | | 137/512.3 |
| 5,168,895 A * | 12/1992 | Voss | F16K 17/046 |
| | | | 137/494 |
| 5,673,563 A | 10/1997 | Albertson et al. | |
| 6,152,170 A * | 11/2000 | Nouveau | E21B 34/04 |
| | | | 137/512 |
| 6,206,032 B1 * | 3/2001 | Hill | F16K 15/042 |
| | | | 137/512 |
| 6,361,458 B1 | 3/2002 | Smith | |
| 6,769,446 B1 * | 8/2004 | Ball | E03B 7/10 |
| | | | 137/301 |
| 9,937,996 B2 | 4/2018 | Joern et al. | |
| 2004/0079417 A1 * | 4/2004 | Auad | B01F 7/00466 |
| | | | 137/512.3 |
| 2007/0215356 A1 * | 9/2007 | Leeb | E21B 21/10 |
| | | | 166/325 |
| 2010/0001103 A1 * | 1/2010 | Neto | F01P 3/08 |
| | | | 239/583 |
| 2010/0163775 A1 * | 7/2010 | Kim | F16K 1/12 |
| | | | 251/357 |
| 2011/0033313 A1 * | 2/2011 | Gruber | F16K 17/0473 |
| | | | 417/1 |
| 2014/0000983 A1 * | 1/2014 | Roys | F04B 39/0223 |
| | | | 184/14 |
| 2016/0040663 A1 | 2/2016 | Herman et al. | |
| 2016/0097486 A1 * | 4/2016 | Herman | F16K 15/044 |
| | | | 184/6 |
| 2017/0219101 A1 * | 8/2017 | Iijima | F16K 1/42 |

FOREIGN PATENT DOCUMENTS

| | | |
|---|---|---|
| CN | 204512560 U | 7/2015 |
| CN | 208237154 U | 12/2018 |
| EP | 1314920 A2 | 5/2003 |
| EP | 1314920 A3 | 8/2003 |
| EP | 1604136 A1 | 12/2005 |
| GB | 12062 A | 8/1912 |
| WO | 2004083698 A1 | 9/2004 |

* cited by examiner

PRESSURE RELIEF VALVE ASSEMBLY

FOREIGN PRIORITY

This application claims priority to European Patent Application No. 18275271.7 filed Dec. 31, 2018, the entire contents of which is incorporated herein by reference.

TECHNICAL FIELD

The present apparatus relates to a pressure relief valve assembly for use in opening engine cowl section during ground maintenance.

BACKGROUND

Commercial jet aircraft have the jet engines mounted in a nacelle which provides a protective housing for the engine and which is provided with doors or cowls that can be opened to access the engine for repair, maintenance etc. It is often necessary to perform checks, maintenance or repair work on an engine during an aircraft stopover—i.e. between landing and take-off. The stopover may only be for a relatively short period of time and delays can be very expensive for airlines and can result in flights missing their take-off slots. It is important, therefore, that the maintenance can be carried out quickly, efficiently and safely.

Present devices used for opening the cowls include mechanical screw or bolt/latch devices, but these have poor reliability and can become stuck and impossible to open or, on the other hand, might not be refastened properly allowing the cowls to open during subsequent flight.

A more reliable device is a hydraulic actuator which is operated by a separate hand pump which is brought to the aircraft by the ground maintenance personnel. A suitable hand pump can also be stowed in the aircraft so that it is quickly available for use when the aircraft is on the ground in the event that a suitable pump is not available at the ground station.

To open the cowl, the pump is attached to the door opening actuator and hydraulic fluid contained within the pump is pumped into the actuator.

A pressure relief valve is provided in case the door is blocked. This valve is opened once the pumping pressure from the ground maintenance pump has exceeded a set point so as to limit the force that the hydraulic actuator can apply to the door structure if the door is blocked.

A conventional pressure relief valve comprises a simple ball and spring assembly where, while the valve is closed, during normal operation, the ball is seated, under the bias of the spring, in a valve seat. If the pressure from the pumped fluid acting on the ball against the spring force exceeds a set point, it pushes the ball out of the seat thus enabling the fluid to flow out of the pressure line to the door actuator thus releasing the pressure on the actuator and thus on the door.

The set point is generally set to a very small range i.e. the range of pressures that will open the pressure relief valve is small. Anything that interferes with that setting, therefore, such as ice or condensation, can adversely affect the reliability of the pressure relief valve.

It has been found that it is difficult to maintain the set point at cold temperatures. In particular, in conditions where ice can form on the spring of the pressure relief valve, the valve might only open at a much higher pressure than planned which can cause damage to the cowl.

This problem arises often, in particular, during short stopovers. The ground crew will come to the aircraft to perform maintenance just as the aircraft has landed. Water that has seeped into the aircraft components, or condensation etc. can freeze while the aircraft is on the ground, or as the aircraft comes into land. This can cause ice to form in the pressure relieve valve e.g. between the spring coils or between the spring and the valve housing thus moving the effective set point of the valve to outside the desired tolerance. Such pressure relief valve units generally need to be small and light and so it is not feasible to incorporate heating devices or the like to prevent ice formation.

This is less of a problem for standard regular aircraft maintenance when the aircraft are in hangars or the like and there is more time to ensure no ice has formed/remains.

There is, therefore, a need for an improved pressure relief valve assembly particularly to avoid these problems at stopover ground maintenance.

SUMMARY

Accordingly, the present disclosure provides a pressure relief valve assembly comprising a valve housing within which is provided a primary pressure relief valve having a valve ball and a valve spring, the valve spring biasing the valve ball in a first direction into a valve seat to prevent the passage of fluid from a fluid line through the valve, and wherein the spring force is selected such that a fluid force above a predetermined set point acting against the ball in a second direction opposite the first direction causes the ball to move out of the valve seat against the spring force to allow fluid to flow from the fluid line through the valve seat and through the valve, and wherein a secondary valve is positioned relative to the primary valve to retain fluid around the valve spring of the primary valve at a fluid force below the predetermined set point.

The secondary valve can be realised in many different ways, provided that below the set point, it acts to retain fluid in the valve housing and beyond the set point, when the primary valve opens, the secondary valve also opens to allow passage of the fluid from the fluid line through the valve housing.

Preferred embodiments will now be described by way of example only with reference to the drawings.

DETAILED DESCRIPTION

Figure 1:
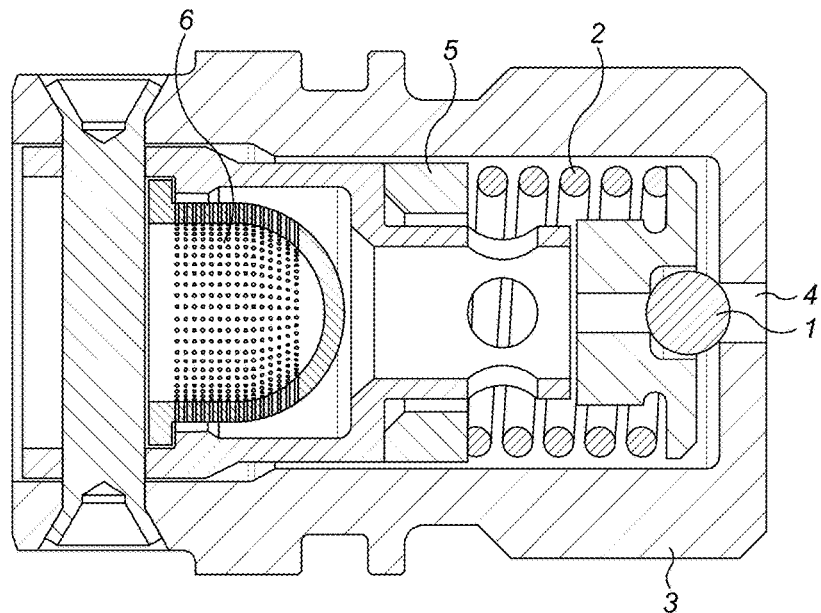
FIG. 1 is a sectional view of a conventional pressure relief valve.

Conventional systems will be first briefly described with reference to FIG. 1. The pressure relief valve comprises a valve ball 1 supported by a valve spring 2 mounted in a valve housing 3. An opening 4 is provided in the housing 3 on the side where the pressurised fluid flows from the pump to the actuator (not shown). In normal operation, the spring force pushes the ball 1 into the valve seat defined by the opening 4 so as to close the opening against the ingress of pressurised fluid from the fluid line.

The conventional pressure relief valve may also have a shim 5 for setting the valve, and a mesh or filter 6 to catch any debris or floating objects that might otherwise damage the valve or adversely affect its operation. The other end 7 of the housing 3 is open to atmosphere.

As discussed above, a problem with such valve assemblies, is that the humid atmosphere after the cold temperatures during flight results in water condensing and ice can form between the spring coils and the spring and the housing which can affect the set point of the valve.

The assembly of the present disclosure avoids the spring being open to atmosphere and thus prevents the formation of ice.

According to the present disclosure, the assembly includes, in addition to the spring and ball valve described above (the primary valve, hereinafter) a secondary valve 8 as described now with reference to FIG. 2.

The secondary valve is a low pressure valve that closes the primary valve off from contact with the atmosphere and that retains hydraulic fluid within the housing 3 of the primary valve to ensure that the valve spring 2 of the primary valve is submersed in hydraulic fluid e.g. oil, while the primary valve is closed. This fluid fills the gaps between the coil springs and the spring and the housing so that ice cannot form there. The secondary valve also prevents the ingress of debris, or FOD, into the primary valve thus avoiding the need for a filter.

Provided the secondary valve functions as a lower pressure valve than the primary valve and ensures that the spring of the primary valve is immersed in hydraulic fluid and not exposed to the atmosphere, many variations are possible.

Figure 2:
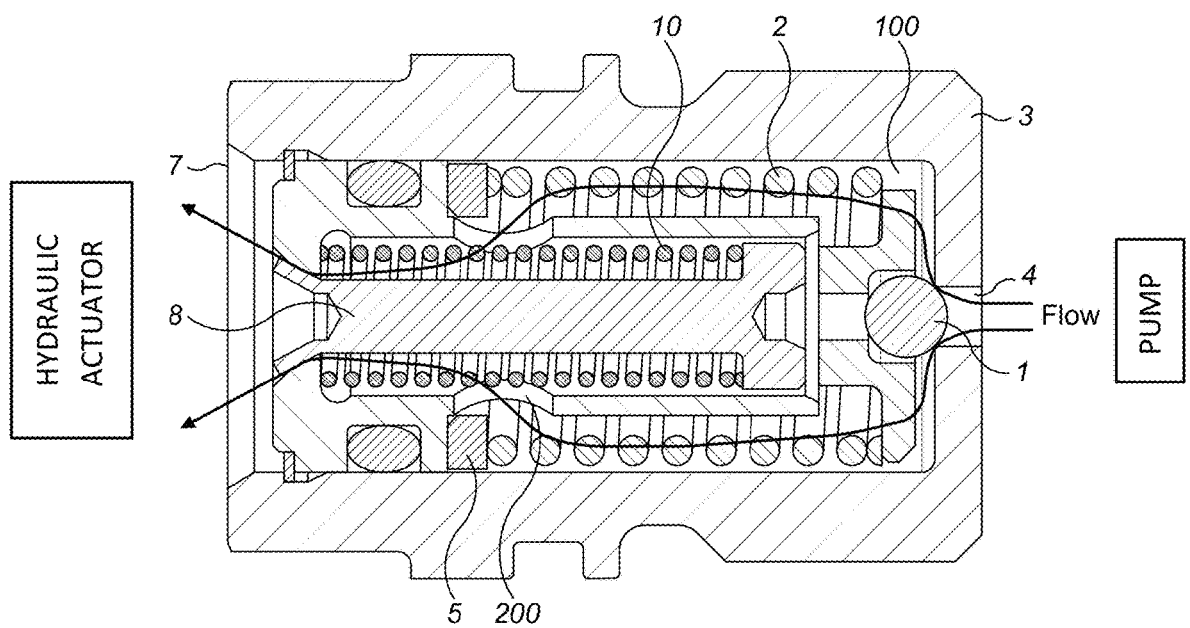
FIG. 2 is a sectional view of a pressure relief valve assembly in accordance with this disclosure.

In the variation shown in FIG. 2, the secondary valve comprises a rod 9 and a spring 10. The rod is held under the force of the spring to prevent flow of fluid out of the secondary valve until the fluid pressure exceeds a secondary set point, lower than the set point of the primary valve. The valve housing 3 is filled with oil or other fluid 100 and this is retained in the housing 3 around the spring 2 of the primary valve by the secondary valve acting as a closure for the housing, rather than the housing being open to atmosphere. When the set point of the primary valve is exceeded as described above, the primary valve ball 1 moves out of the valve seat opening 4. Because the set point of the secondary valve is lower than that of the primary valve, the force of the secondary spring 10 is also overcome, allowing the rod 9 to move against the spring force to open a secondary valve opening 200 and to allow fluid to flow out through the secondary valve via the spring 2 of the primary valve, as shown by the arrows in FIG. 2. The set point of the primary valve is thus maintained.

Alternative valve arrangements for the secondary valve are shown in FIGS. 3A to 3E.

Figure 3A:
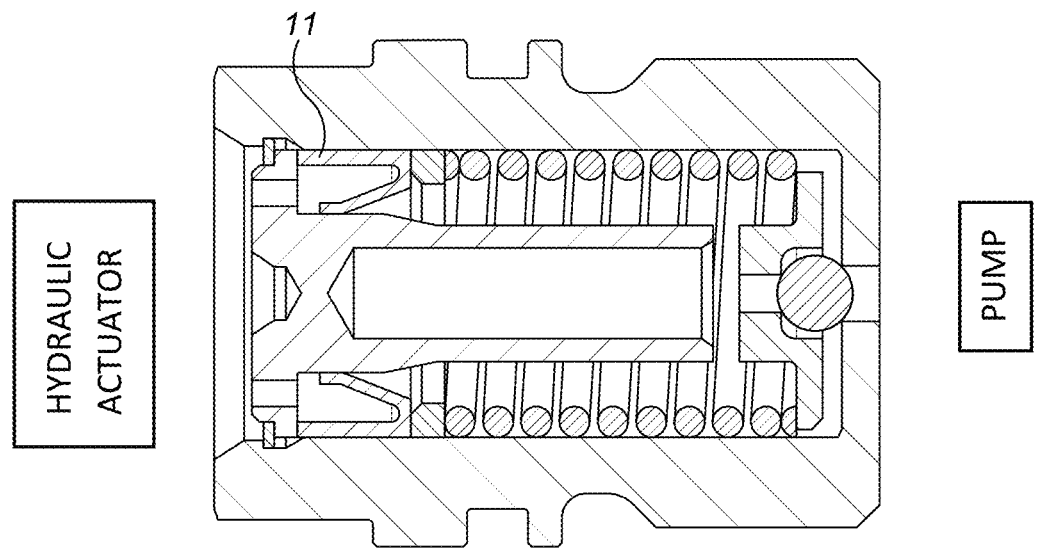
FIGS. 3A to 3E are alternative examples of pressure relief valve assemblies according to this disclosure.
Figure 3B:
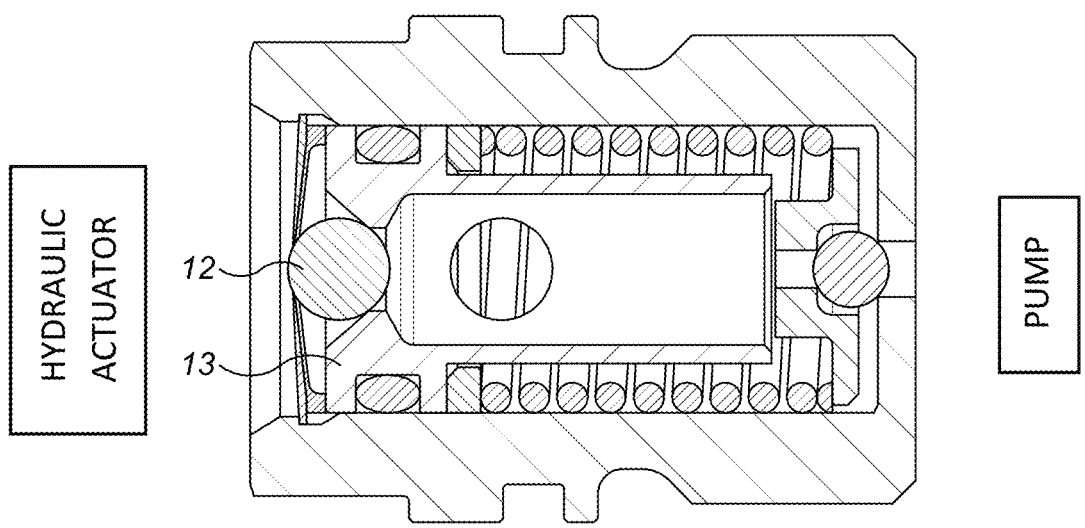
Figure 3C:
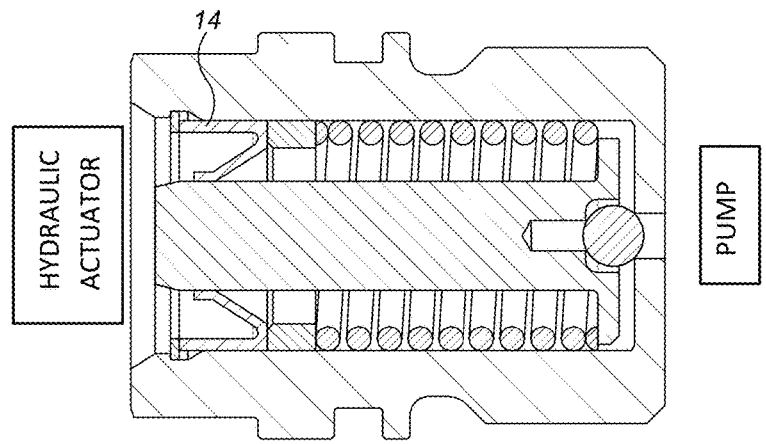
Figure 3D:
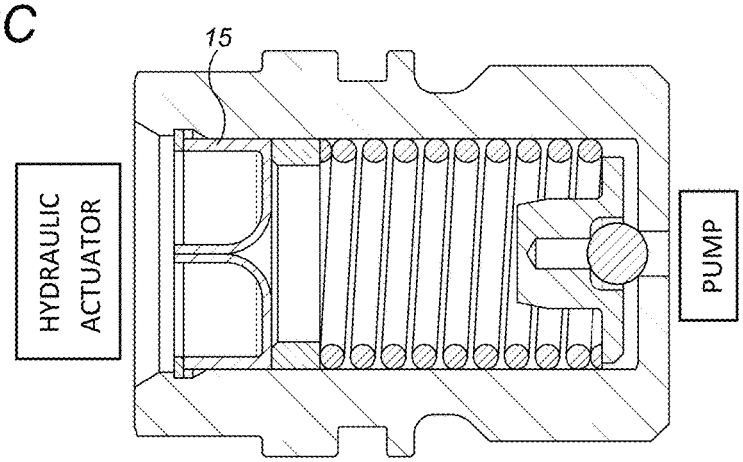
Figure 3E:
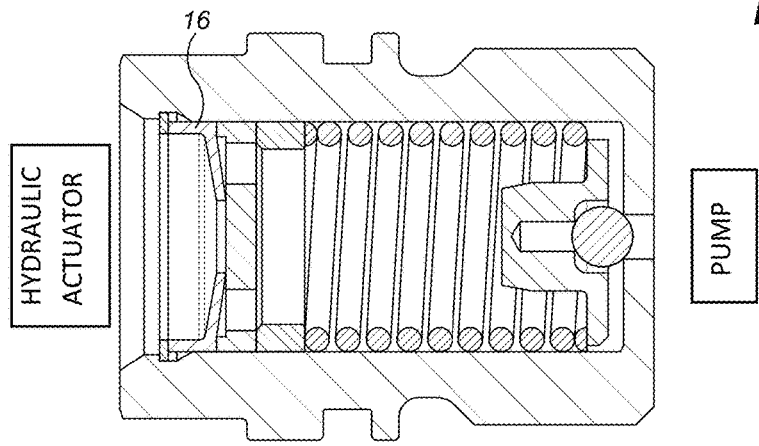

FIG. 3A uses an elastomeric lip seal 11 to close the valve off to atmosphere. FIG. 3B is formed using a ball 12 retained by a disk spring 13. FIG. 3C is a simplified variation of FIG. 3A using an elastomeric seal whereby movement of the primary valve ruptures the elastomeric element 14. FIG. 3D uses an elastomeric reed seal 15. FIG. 3E uses an elastomeric button or flap seal 16.

The arrangement of this disclosure finds specific application for opening engine nacelle cowls for ground maintenance to ensure that the pressure relief valve operates within the small tolerance ranges required around the set point to avoid damage to the cowl opening system.

The valve assembly is mounted on or in the hydraulic actuator for opening the cowl.

The invention claimed is:

1. A hydraulic actuator system for opening a door structure of an aircraft, the hydraulic actuator system comprising:
    a hydraulic actuator;
    a pump for pumping hydraulic fluid to the hydraulic actuator; and
    a pressure relief valve (PRV) assembly in a fluid line between the pump and the hydraulic actuator, the PRV assembly configured to open if the pressure in the fluid line exceeds a predetermined set point, the PRV assembly comprising:
        a valve housing, the valve housing having a substantially rectangular opening therethrough opening into the fluid line;
        a primary pressure relief valve having a valve ball and a valve spring within the valve housing, the valve spring biasing the valve ball in a first, closed direction into a valve seat to prevent the passage of fluid from a fluid line through the valve;
        wherein the spring force is selected such that a fluid force above a predetermined set point acting against the ball in a second direction opposite the first direction causes the ball to move out of the valve seat against the spring force to allow fluid to flow from the fluid line through the valve seat and through the valve;
        wherein oil is provided inside the housing around the valve spring; and
        a secondary valve positioned in the housing relative to the primary pressure relief valve to retain oil around the valve spring of the primary pressure relief valve at a fluid force below the predetermined set point, the secondary valve being a relatively low pressure valve that closes the primary valve from contact with the atmosphere and retains the oil within the valve housing and around the valve spring such that the valve spring is submersed in oil while the primary pressure relief valve is closed.

2. The system of claim 1, wherein the secondary valve is a poppet valve comprising a valve spring and a valve opening whereby the valve opening remains closed so as to retain the oil around the primary valve spring until the predetermined set point is reached and wherein at the predetermined set point the valve opening opens against the force of the spring to allow the oil to flow out through the valve housing.

3. The system of claim 1, wherein the secondary valve comprises a seal which is released when the set point is reached to allow fluid to flow out through the valve housing.

4. The system of claim 1, wherein the secondary valve comprises a ball retained by a disc spring whereby the disc spring is released to move the ball away from an opening when the set point is reached to allow fluid to flow out through the valve housing.

5. The system of claim 1, wherein the secondary valve comprises a membrane which is ruptured when the set point is reached to allow fluid to flow out through the valve housing.

* * * * *